UNITED STATES PATENT OFFICE.

LESLIE R. MOORE, OF NEWTON, MASSACHUSETTS.

RUBBER CEMENT.

SPECIFICATION forming part of Letters Patent No. 680,387, dated August 13, 1901.

Application filed May 24, 1900. Serial No. 17,826. (No specimens.)

*To all whom it may concern:*

Be it known that I, LESLIE R. MOORE, of Newton, in the county of Middlesex and State of Massachusetts, have invented certain new and useful Improvements in Compositions of Matter, of which the following is a specification.

My invention consists in an improvement in solutions of which caoutchouc is a constituent, and has for its object the provision of a solution of more stability than has heretofore been found.

In the preparation and use of solutions of caoutchouc as usually prepared it is well known that the exposure of such solutions to light and air causes a gradual decomposition of the caoutchouc and renders the compound worthless for the purpose intended, the degree and time of such change depending on the quality of the material used. For instance, in the preparation of what is known as "rubber" cement by dissolving unvulcanized caoutchouc in a distillate of petroleum it is often found that exposure to the light will cause the gum to gather in a sedimentary form and leave the solution worthless for cementing purposes. In my investigations I have found that the cause of this is the oxygenation of the caoutchouc, which is very unstable when in solution. I have found that the process can be arrested or prevented by the use in the solution of a reducing agent, such as pyrogallol, and herein lies my invention.

In carrying out my said invention I dissolve one kilogram of caoutchouc in about sixteen liters of suitable solvent, such as petroleum distillate, and add thereto twenty-five grams of a chemical reducing agent, such as pyrogallol, thoroughly mixing the same.

I do not limit my invention to the exact proportions named or to the identical material herein named as a reducing agent; but any chemical reducing agent of similar reducing properties, such as paraämidophenol hydrochlorid or hydroquinon, is within the scope of my invention.

I claim—

1. A new composition of matter for use in the arts consisting of the combination with solutions of caoutchouc and similar gums of a reducing agent, substantially as herein set forth.

2. A new composition of matter consisting of caoutchouc dissolved in a suitable solvent as petroleum distillate combined with a reducing agent, as pyrogallol, substantially as herein described.

In testimony whereof I have affixed my signature in presence of two witnesses.

LESLIE R. MOORE.

Witnesses:
STEPHEN MOORE,
ALBERT C. Y. MACADAM.